H. T. WIGGINTON.
Animal-Trap.

No. 197,706.

Patented Nov. 27, 1877.

WITNESSES

INVENTOR
H. T. Wigginton,

ATTORNEYS.

UNITED STATES PATENT OFFICE.

HENRY T. WIGGINTON, OF AUXVASSE, MISSOURI.

IMPROVEMENT IN ANIMAL-TRAPS.

Specification forming part of Letters Patent No. 197,706, dated November 27, 1877; application filed August 10, 1877.

*To all whom it may concern:*

Be it known that I, HENRY T. WIGGINTON, of Auxvasse, in the county of Callaway, and in the State of Missouri, have invented certain new and useful Improvements in Rat and Mouse Traps; and do hereby declare that the following is a full, clear, and exact description thereof, reference being had to the accompanying drawing, and to the letters of reference marked thereon, making a part of this specification.

The nature of my invention consists in the construction and arrangement of an animal-trap, as will be hereinafter more fully set forth.

In order to enable others skilled in the art to which my invention appertains to make and use the same, I will now proceed to describe its construction and operation, referring to the annexed drawing, in which—

Figure 1:
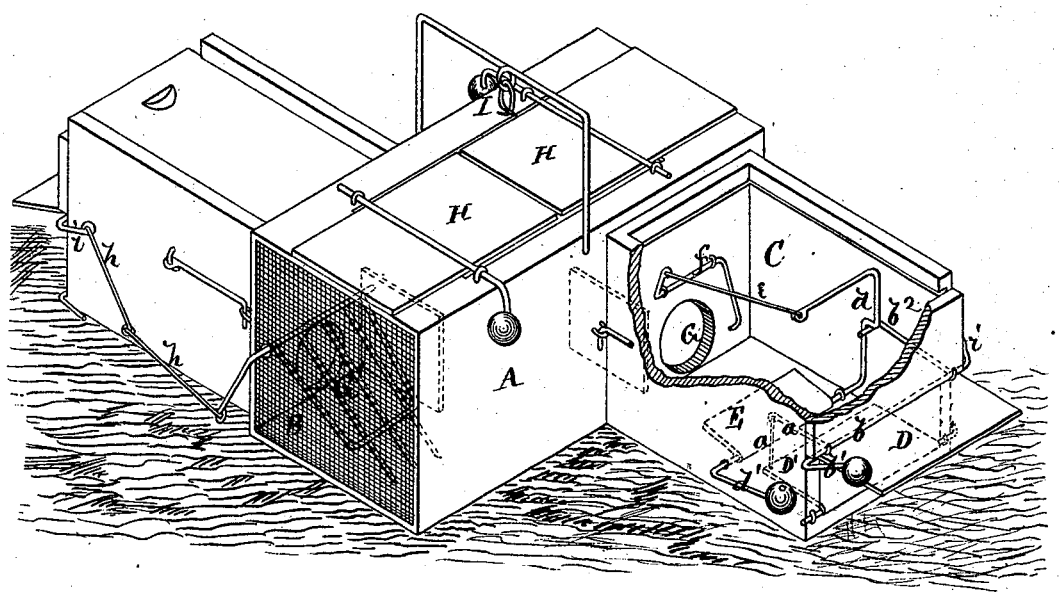
Figure 2:
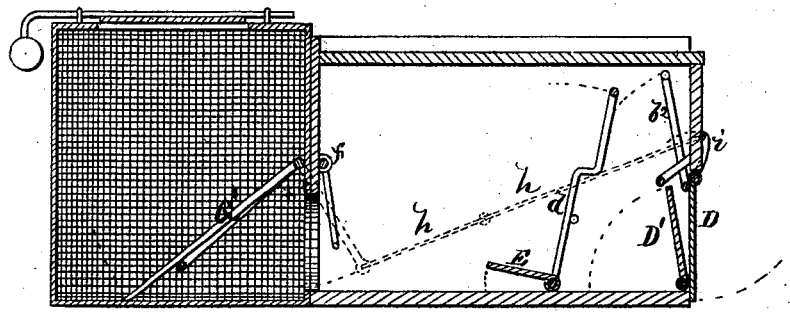

Figure 1 is a perspective view of my animal trap, and Fig. 2 is a vertical section of the same.

A represents a box, of any suitable dimensions, having wire-cloth B at its ends to give light into the box.

On opposite sides of the box A, and at opposite ends, are attached boxes C C, which are constructed exactly alike, so that a description of one will answer for both.

The outer end of the box C is provided with an opening at the bottom extending the entire width of the box, and this opening is provided with two doors, D and D'. The door D is hinged at the top, on the outside, and the door D' is hinged at the bottom, on the inside of the box, and the two doors connected by rods $a$ $a$, so as to operate simultaneously, both closing at the same time and both opening at the same time. In Fig. 1 they are both shown open, and in Fig. 2 they are both shown closed.

The hinge of the door D is formed of a rod, $b$, on one end of which is a weighted arm, $b^1$, the tendency of which is to close said door.

Within the box C is a hinged treadle, E, provided with a weighted arm, $d'$, so arranged that its tendency will be to raise the treadle and throw a bent wire, $d$, also projecting from it, as shown in Fig. 1, over a hook-arm, $b^2$, projecting from the door D into the box, and thus hold both doors D and D' open. From the end of the bent wire $d$ a link, $e$, connects it with a crank-wire, $f$, at the inner end of the box, and to which the bait is attached.

The animal entering the box steps on the treadle E and trips the same, which removes the bent wire $d$ from the arm $b^2$, and both doors D D' at once close, thus preventing the escape of the animal. If by any means the animal should, by jumping or otherwise, fail to touch the treadle, any attempt to remove the bait from the wire $f$ accomplishes the result of closing the trap.

The box C is connected with the main box A by a passage, G, in front of which is a drop-wire, G'. The animal, passing from the trap C into the cage A, raises this drop-wire G', and this, being connected by links $h$ $h$ with an arm, $i$, on the rod $b$, raises and sets the doors again, the same as before, the drop-wire G' preventing the return of the animal to the box or trap C.

On top of the main box or cage A are hinged weighted trip-doors H H, so adjusted that the animal passing over the cage will be precipitated into and confined in the cage, said doors at once dropping back to their places. Over these doors is a suspended bait-hook, I.

Having thus fully described my invention, what I claim as new, and desire to secure by Letters Patent, is—

1. In an animal-trap, the combination of the box C, double doors D D', arm $b^2$, treadle E, bent wire $d$, link $e$, and bait-wire $f$, all substantially as and for the purposes herein set forth.

2. The combination, with the box C, double doors D D', arm $b^2$, treadle E, wire $d$, and link $e$, of the cage A, with passage G, drop-wire G', connecting-links $h$, and crank $i$, on the rod $b$, substantially as and for the purposes herein set forth.

In testimony that I claim the foregoing I have hereunto set my hand this 11th day of July, 1877.

HENRY T. WIGGINTON.

Witnesses:
D. H. McINTYRE,
JOHN W. GARDNER.